United States Patent Office 2,824,003
Patented Feb. 18, 1958

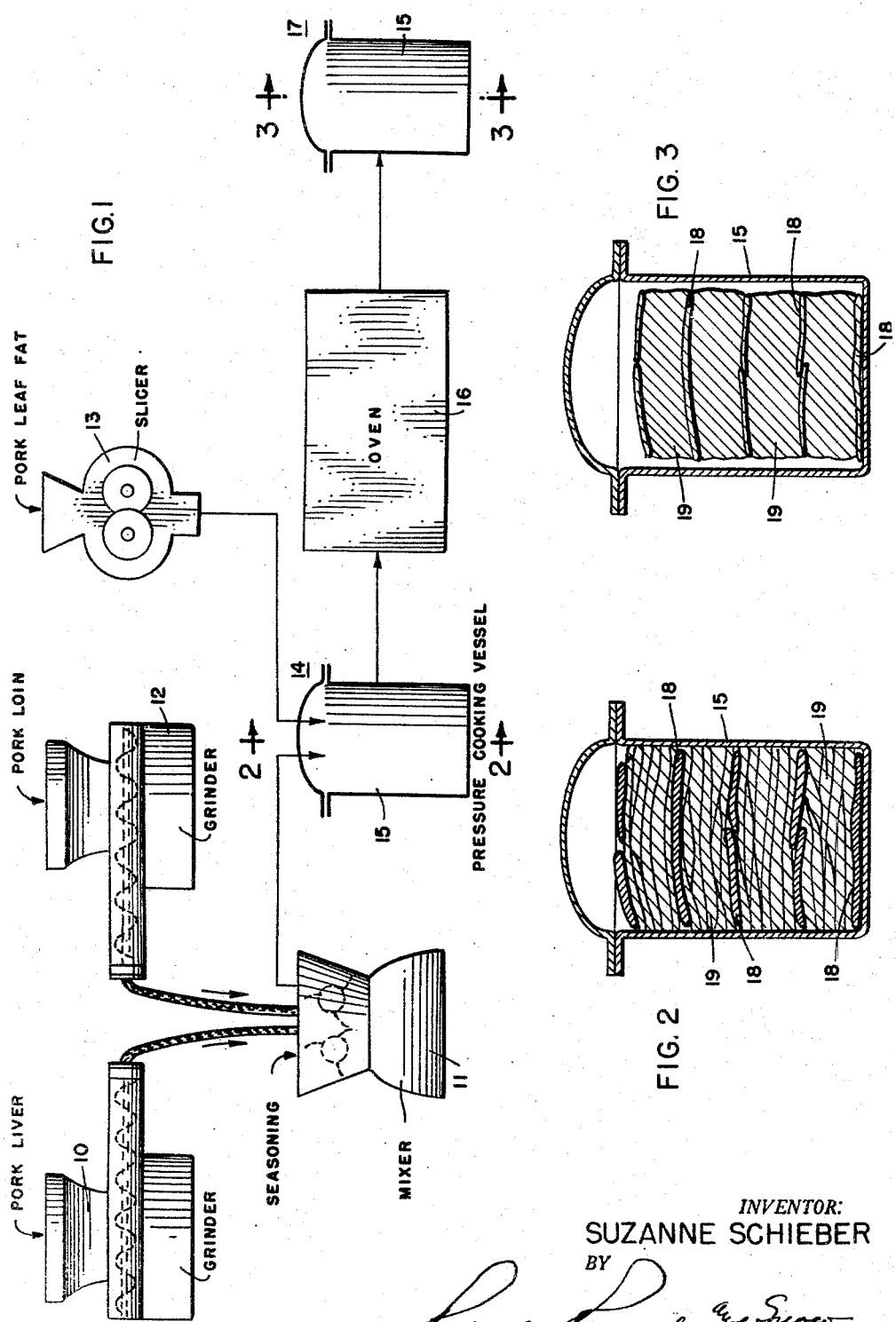

2,824,003

METHOD OF PREPARING A LIVER LOAF

Suzanne Schieber, Chicago, Ill.

Application March 2, 1955, Serial No. 491,688

4 Claims. (Cl. 99—107)

This invention relates to a meat product and to a method for preparing it. More specifically, this invention is concerned with a meat product containing liver as a principal ingredient.

Meat products containing liver as a principal ingredient, such as liver sausage, have been on the market for many years. Such products, however, require the use of a sausage casing for holding the soft, mushy liver paste. Heretofore, as far as applicant is aware, no method has been available for preparing a liver loaf, as distinguished from a casing-packaged product, which would hold together while being handled in commercial distribution. There has also been a need for improving other properties of meat products containing liver.

It is therefore a general object of this invention to provide a satisfactory answer to the problems just discussed. More specifically, it is an object to provide a method for producing a liver loaf, which results in a meat product containing liver as a principal ingredient while at the same time being sufficiently sturdy for distribution through the channels of commerce. In this connection, another specific object is to provide a liver-containing meat product and a method of producing it without requiring any casing or covering for the product. Further objects and advantages will appear as the specification proceeds.

This invention is shown in illustrative embodiment in the accompanying drawings, in which—

Fig. 1 is a diagrammatic flow sheet illustrating the preparation of a meat product in accordance with this invention; Fig. 2, a cross-sectional view of the pressure-cooking vessel containing the meat product prior to cooking, the section being taken on line 2—2 of Fig. 1; and Fig. 3, a cross-sectional view of the pressure-cooking vessel showing the meat product after cooking, the section being taken on line 3—3 of Fig. 1.

In one of its aspects, this invention is concerned with a method of producing a liver loaf, wherein the loaf is built up by successively disposing a relatively thick layer of a mixture of finely-ground liver and finely-ground lean meat on a relatively thin layer formed of strips of un-rendered animal fat, thereby obtaining a loaf having alternating layers of the ground meat mixture and the fat strips. The loaf thus obtained is then heated under steam pressure to render the fat in the strips while knitting the loaf into a compact mass. The method and product of this invention can be more clearly understood by reference to the accompanying drawing, which will now be discussed.

Looking first at Fig. 1, there is shown a grinder 10 into which is fed pork liver, the finely-ground liver being discharged into a mixer 11. Also, there is shown a grinder 12 into which pork loin is introduced and after being finely ground, is passed to mixer 11. The finely-ground pork liver and pork loin materials are thoroughly mixed within mixer 11, and if desired various seasonings can be introduced and dispersed throughout the mixture.

Still looking at Fig. 1, there is shown a slicer 13 into which is introduced sheets of pork leaf fat which are cut into strips and then passed to a filling station at 14, as is the mixture from mixer 11. At filling station 14 pressure-cooking vessels, such as vessel 15, are filled by disposing successive layers therein of the fat strips and the meat mixture. After each pressure vessel is filled and sealed, it is passed into oven 16 wherein the meat filling therein is subjected to the action of heat and steam, as will subsequently be more fully described. After the treatment in oven 16, the cooking vessels are discharged to a cooling and removal station at 17. At station 17, after the cooking vessels have cooled to around room temperature, they are opened and the meat product therein is removed, and is at this point ready for commercial distribution.

Figs. 2 and 3 respectively illustrate the appearance of the filling within the cooking vessel 15 before the cooking operation and the appearance of the meat product after the cooking operation. As shown in Fig. 2, the fat strips 18 are arranged in thin, horizontally-extending layers with the mixture of liver and lean meat 19 arranged therebetween in relatively thick layers. After the heat treatment in oven 16, the product will have an appearance similar to that illustrated in Fig. 3. It will be noted that both the fat strips 18 and the meat mixture 19 have been considerably reduced in size, and that the entire filling has been knitted together into a compact mass, thereby providing a loaf of sufficient cohesive strength to permit it to be sliced without the slices falling apart.

During the heating period, the temperature should be high enough to generate steam pressure within the cooking vessels 15, that is, temperatures substantially above 212° F. should be used. Usually temperatures around 250° F. are satisfactory if the heat treatment is continued for from 2 to 4 hours, although this can be varied considerably. The combined effect of the temperature and steam pressure on the filling produces several highly desirable results: Specifically, the fat in the strips 18 is rendered and dispersed through the layers 19. As the liquefied fat is forced out of the strips 18, the strips shrink in size, and this can continue until the strips 18 are substantially free of fat and only tissue residue remains. This tissue residue, however, has been found to be highly effective in binding together and increasing the cohesive strength of the meat loaf. Also, the steam pressure during the heat treatment acts to knit the entire loaf into a compact mass, and this also increases the firmness and cohesive strength of the meat product.

This invention is further illustrated by the following specific example.

Example

A liver loaf of a size suitable for commercial distribution can be prepared as follows. Separately grind 5 lbs. of fresh pork liver and 5 lbs. of fresh pork loin. Mix these finely-ground materials together to form a soft, pasty mixture. Prior to or during this mixing, add the desired seasoning ingredients, including 2 oz. of salt and ½ oz. of mixed spices (e. g., pepper, nutmeg, allspice). This completes the preparation of the meat paste.

Slice a sheet of fresh hog liver fat (leaf lard) into long strips of about 3/16 inch in thickness, and then form the loaf by building up successive layers of the fat strips and meat paste. Specifically, first form a thin layer of the fat strips, and then place a thick layer of the meat paste thereon, next form another thin layer of the fat strips, and so on. This forming operation can be conveniently carried out in the pressure-cooking vessel which is to be used for the heating or cooking step.

After the meat product has been formed as described and placed within a pressure-cooking vessel, the vessel is sealed and then placed within an oven, wherein it is heated for 3 hours at 250° F. Finally, the pressure-cooking vessel is removed from the oven, allowed to cool to room temperature, and then opened. The completed meat product is then ready for use or commercial distribution.

As indicated above, pork liver is preferred for use in preparing the meat product in accordance with this invention, but it will be understood that other kinds of liver can be substituted if desired. Also, other types of lean meat, or specifically lean pork, can be substituted for the preferred pork loin. While strips of hog leaf fat have been found to give best results, other strips of unrendered fat will function similarly.

While in the foregoing specification this invention has been described in relation to preferred embodiments thereof, it will be apparent to those skilled in the art that the invention is susceptible to other embodiments than those described herein, and that certain of the specific details can be varied without departing from the basic principles of the invention.

I claim:

1. The method of producing a liver loaf, comprising building up a loaf by successively disposing a relatively thick layer of a mixture of finely-ground liver and finely-ground lean meat on a relatively thin layer formed of strips of unrendered animal fat, thereby obtaining a loaf having alternating layers of said mixture and said strips, and then heating the loaf thus obtained within an enclosed vessel, said heating being carried out at a temperature of approximately 250° F. for a period of between two to four hours, whereby a substantial portion of the fat in said strips has been rendered and dispersed into the layers of said mixture.

2. The method of producing a liver loaf, comprising building up a loaf by succesively disposing a relatively thick layer of a finely-ground mixture of pork liver and pork loin on a relatively thin layer formed of strips of pork leaf fat, thereby obtaining a loaf having alternating layers of said mixture and said strips, and then heating the loaf thus obtained within an enclosed vessel, said heating being carried out at a temperature of approximately 250° F. for a period of between two to four hours, whereby a substantial portion of the fat in said strips has been rendered and dispersed into the layers of said mixture.

3. The method of producing a liver loaf, comprising forming a loaf having a plurality of alternating thick and thin horizontally-extending layers, the thick layers therein being composed of a mixture of finely-ground liver and finely-ground lean meat, and the thin layers therein being composed of a plurality of strips of unrendered animal fat, and then heating said loaf at fat-rendering temperature and under steam pressure to liquefy the fat in said strips and force it out into the mixture composing said thick layers while at the same time reducing the thickness of said strips, said heating being carried out at a temperature of approximately 250° F. for a period of three hours, whereby a substantial portion of the fat in said strips has been rendered and dispersed into the layers of said mixture.

4. The method of producing a liver loaf, comprising forming a loaf having a plurality of alternating thick and thin horizontally-extending layers, the thick layers therein being composed of a finely-ground mixture of pork liver and pork loin and the thin layers being composed of a plurality of strips of pork leaf fat, and then heating said loaf at fat-rendering temperature and under steam pressure to liquefy the fat in said strips and force it out into the mixture composing said thick layers while at the same time reducing the thickness of said strips, said heating being carried out at a temperature of approximately 250° F. for a period of three hours, whereby a substantial portion of the fat in said strips has been rendered and dispersed into the layers of said mixture.

References Cited in the file of this patent

UNITED STATES PATENTS

| | | |
|---|---|---|
| 1,427,438 | Brickman | Aug. 29, 1922 |
| 1,956,239 | Kuhner | Apr. 24, 1934 |

FOREIGN PATENTS

| | | |
|---|---|---|
| 377,256 | Great Britain | July 15, 1932 |
| 377,766 | Great Britain | Aug. 4, 1932 |

OTHER REFERENCES

"Encyclopedic Cook Book," 1948, by Ruth Berolzheimer, published by Culinary Arts Institute, Chicago, Illinois, pages 240 and 402.